Oct. 31, 1933.  C. G. WOOD  1,932,998

SCREW ACTUATED CONE TYPE BRAKE

Filed April 25, 1930   2 Sheets-Sheet 1

INVENTOR.
Clarence G. Wood
BY
Fay, Oberlin & Fay
ATTORNEYS

Oct. 31, 1933.  C. G. WOOD  1,932,998

SCREW ACTUATED CONE TYPE BRAKE

Filed April 25, 1930  2 Sheets-Sheet 2

INVENTOR.
Clarence G. Wood
BY
Fay, Oberlin & Fay
ATTORNEYS

Patented Oct. 31, 1933

1,932,998

UNITED STATES PATENT OFFICE 1,932,998

SCREW ACTUATED CONE TYPE BRAKE

Clarence G. Wood, Cleveland, Ohio

Application April 25, 1930. Serial No. 447,194

2 Claims. (Cl. 188—71)

The present invention relates, as indicated, to a screw actuated cone type brake and the structure herein described is intended primarily for use upon brakes designed to be applied to articulated wheels; the steering wheels of automotive vehicles. The primary object of the invention is to provide a brake in which all the points upon the friction face of the shoe will be brought simultaneously into engagement with the friction face of the drum. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
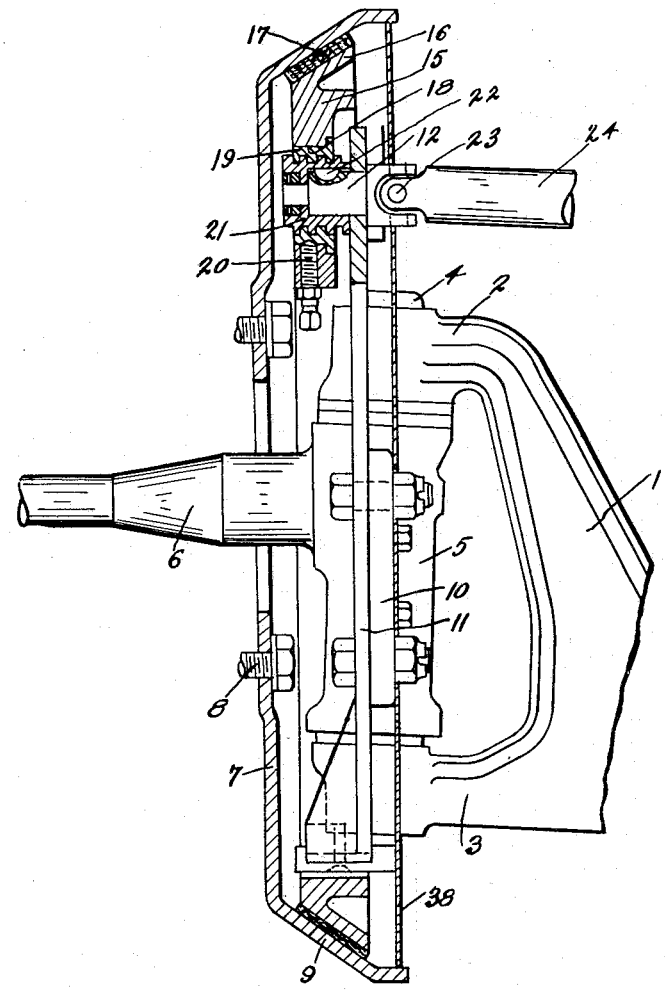
Figure 3:
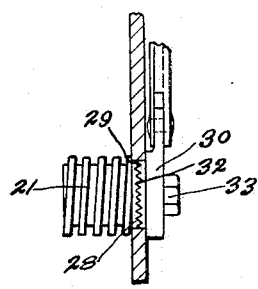
Figure 2:
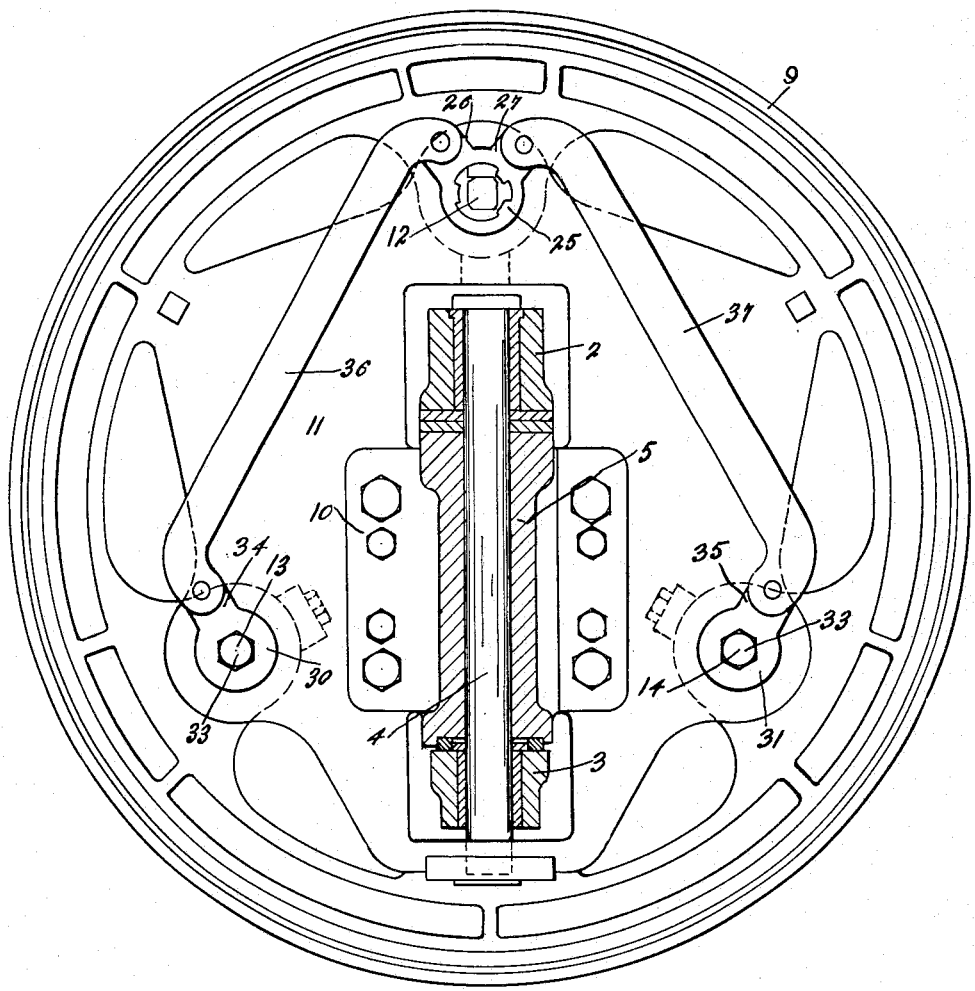

In said annexed drawings:

Fig. 1 is a rear elevation, partly in section of a brake of the type described; Fig. 2 is a side elevation thereof; and Fig. 3 is a view of a detail.

Referring more particularly to the drawings, the reference numeral 1 indicates a dead axle forked at its end to provide furcations 2 and 3, said furcations providing bearings for a spindle 4 upon which is swivelled the hub 5 of a stub axle 6 for receiving a wheel (not shown). A brake drum 7 is secured to said wheel by means of bolts 8, or the like, and is formed to provide an annular conical flange 9. A bracket 10 upon the hub 5 provides a support for a plate 11. The plate 11 is formed to provide journals for a plurality of short spindles 12, 13, and 14, said spindles being spaced about the plate to form the apices of an equilateral triangle.

An annular brake shoe 15 is mounted between said plate and said drum 7, and is formed with a frusto-conical peripheral flange 16 adapted to carry a friction band 17. It will be noted that the flanges 9 and 16 present parallel adjacent faces to each other. The brake shoe 15 is supported upon the spindles 12, 13, and 14, said shoe being provided with a plurality of apertures 18 spaced to correspond with the positions of said spindles, and adapted to receive internally threaded bushings 19 secured in place by means of set screws 20. Each of said spindles 12, 13, and 14 carries at its end an externally threaded screw member 21 keyed to its spindle as at 22, and each of said screw members 21 cooperates with the internal threads of one of said bushings 19. A universal joint 23 provides a connection between the spindle 12 and an operating shaft 24, said shaft being connected to any suitable operating means for the brake. As is clearly shown in Fig. 2, a collar 25 is splined to the outer end of said spindle 12 and is formed with a pair of angularly projecting radial ears 26 and 27, the purpose of which will later be described.

Each of the spindles 13 and 14 is formed at one end with an annular flange 28 providing axially extending teeth 29, and a collar 30 or 31 provided with similarly formed teeth 32 is swivelled on each of said spindles and is adapted to be secured thereto by a cap screw 33, or the like. It will be readily understood that the angular position of the collar 30 or 31 may be varied by loosening the cap screw 33, backing said collar off sufficiently to permit the disengagement of the teeth 32 from the teeth 29, and rotating said collar to the desired position, thereafter again tightening the cap screw 33 to force the teeth 32 into engagement with the teeth 29.

The collar 30 is provided with a laterally extending ear 34, while the collar 31 is provided with a similar ear 35, and a link 36 connects said ear 34 with the ear 26 of the collar 25, while a similar link 37 connects the ear 35 with the ear 27 of said collar 25. Thus it will be seen that rotation of the shaft 24 causes rotation of the spindle 12 and of its collar 25 and, through the medium of the links 36 and 37 causes a corresponding rotation in the same direction of the spindles 13 and 14.

The operation of the device is believed to be apparent, but a brief summary thereof may be given here. Presuming the threads on the screw members 21 to be right hand threads, rotation of the shaft 24 in a counter-clockwise direction as viewed in Fig. 2 will cause bodily movement of the brake shoe 15 toward the left as viewed in Fig. 1, it being understood that longitudinal shifting of the spindles 12, 13, and 14 is prevented by shoulders on said spindles, and by the fact that the screw members 21 are larger than the apertures in the plate 11 through which said spindles extend. Because of the fact that the flanges 16 and 9 are parallel with each other, the whole surface of the friction band 17 will engage the inner surface of the flange 9 at once, and simultaneous engagement of all points on the band 17 with the flange 9 will not be affected by wear of said friction band. Correspondingly, rotation of the shaft 24 in a clockwise direction as viewed in Fig. 2 will move the brake shoe toward the right as viewed in Fig. 1 to release the engagement between the friction band 17 and the flange 9. The structure most clearly illustrated in Fig. 3 permits very close adjustment of the relative positions of the collars 30 and 31 with respect to the collar 25. It is to be noted that the plate or bracket 11 is so located, and the journal for the spindle 12 is so placed, that the universal joint 23 is disposed upon a continuation of the axial line of the spindle 4. Thus the stub axle 6 may be swung about the spindle 4 in steering without interfering with the action of the brake.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A vehicle brake comprising, in combination with a forked axle, a stub axle having a hub adapted to be received between the forks of said axle, a spindle pivoting said hub in such position, and a wheel journalled on said stub axle, a brake drum secured to said wheel and formed with an internal conical face, a disk-like bracket secured to said hub in a plane containing the axis of said spindle, at least three screws journalled in said bracket at equally spaced points about the circumference thereof, said screws projecting from one face of said bracket parallel with the axis of said stub axle, an annular brake shoe mounted between said drum and bracket and having a conical external face, said shoe being provided with screw threaded apertures corresponding in number and position with said screws, said screws being received in said apertures, respectively, an articulated rock shaft connected to one of said screws for rotating the same, and links connecting said screw with the remaining screws, whereby rotation of said first screw is accompanied by like rotation of the remaining screws.

2. A vehicle brake comprising, in combination with a forked axle, a stub axle having a hub adapted to be received between the forks of said axle, a spindle pivoting said hub in such position, and a wheel journalled on said stub axle, a brake drum secured to said wheel and formed with an internal conical face, a disk-like bracket secured to said hub in a plane containing the axis of said spindle, at least three screws journalled in said bracket at equally spaced points about the circumference thereof, said screws projecting from one face of said bracket parallel with the axis of said stub axle, an annular brake shoe mounted between said drum and bracket and having a conical external face, said shoe being provided with screw threaded apertures corresponding in number and position with said screws, said screws being received in said apertures, respectively, an articulated rock shaft connected to one of said screws for rotating the same, a collar, provided with a pair of angularly related apertured projecting ears, secured to said screw, a collar provided with an apertured projecting ear adjustably secured to each of the remaining screws, and a link connecting each of the ears on the collar on said first screw with the ear on the collar on one of said remaining screws.

CLARENCE G. WOOD.